(12) United States Patent
Dierkes (10) Patent No.: US 7,632,403 B2
(45) Date of Patent: Dec. 15, 2009

(54) LIQUID FILTRATION SYSTEM

(75) Inventor: Carsten Dierkes, Munster (DE)

(73) Assignee: Royal Environmental Systems, Inc., Stacy, MN (US)

( * ) Notice: Subject to any disclaimer, the term of this patent is extended or adjusted under 35 U.S.C. 154(b) by 0 days.

(21) Appl. No.: 12/027,092

(22) Filed: Feb. 6, 2008

(65) Prior Publication Data

US 2008/0121579 A1    May 29, 2008

Related U.S. Application Data

(63) Continuation-in-part of application No. 11/043,379, filed on Jan. 26, 2005.

(51) Int. Cl.
*C02F 1/00* (2006.01)
*B01D 41/00* (2006.01)
*B01D 21/00* (2006.01)
*B01D 35/00* (2006.01)
*B01D 21/24* (2006.01)

(52) U.S. Cl. ............... 210/170.03; 210/510.1; 210/437; 210/440; 210/428

(58) Field of Classification Search ............ 210/303, 210/299
See application file for complete search history.

(56) References Cited

U.S. PATENT DOCUMENTS

| | | | | |
|---|---|---|---|---|
| 1,236,645 | A * | 8/1917 | Allen ..................... | 210/200 |
| 1,763,773 | A | 6/1930 | Godbe | |
| 1,784,132 | A * | 12/1930 | Cabrera ................. | 210/150 |
| 3,199,996 | A | 8/1965 | Bailly | |
| 3,343,680 | A * | 9/1967 | Rice et al. .............. | 210/263 |
| 3,865,725 | A * | 2/1975 | Condolios et al. ...... | 210/787 |
| 3,898,160 | A * | 8/1975 | Finley ................... | 210/696 |
| 4,208,288 | A * | 6/1980 | Stannard et al. ........ | 210/277 |
| 4,211,655 | A * | 7/1980 | Jordan .................. | 210/108 |
| 4,765,892 | A | 8/1988 | Hulbert et al. | |
| 4,923,606 | A * | 5/1990 | Gresh et al. ............ | 210/275 |
| 4,925,556 | A * | 5/1990 | Gaudin et al. .......... | 210/293 |

(Continued)

FOREIGN PATENT DOCUMENTS

GB    1403186    8/1975

OTHER PUBLICATIONS

U.S. Standard Sieve Series, available at http://www.wirecloth.com/howto/convert/ussieve.html on Apr. 25, 2008.*

(Continued)

*Primary Examiner*—Walter D Griffin
*Assistant Examiner*—Denise R Anderson
(74) *Attorney, Agent, or Firm*—James J. Paige; Nikolai & Mersereau, P.A.

(57) ABSTRACT

In some embodiments, a filtration system may include one or more of the following features: (a) a housing having a bottom portion, a middle portion coupled to the bottom portion and an upper portion, and a cap coupled to the upper portion, (b) a sediment storage area within the bottom portion, (c) a separator area within the middle portion, (d) a porous filter within the upper portion, (e) an access hatch within the cap, (f) an inlet pipe for allowing storm water within a middle chamber, (g) an outlet pipe for allowing filtered water to be discharged from the filtration system, and (h) a central pipe being a passageway through the porous filter.

7 Claims, 5 Drawing Sheets

U.S. PATENT DOCUMENTS

| | | | |
|---|---|---|---|
| 4,985,148 A | 1/1991 | Monteith | |
| 5,498,331 A | 3/1996 | Monteith | |
| 5,520,804 A * | 5/1996 | Ward | 210/189 |
| 5,725,760 A | 3/1998 | Monteith | |
| 5,753,115 A | 5/1998 | Monteith | |
| 5,849,181 A | 12/1998 | Monteith | |
| 6,068,765 A | 5/2000 | Monteith | |
| 6,200,469 B1 | 3/2001 | Wallace | |
| 6,371,690 B1 | 4/2002 | Monteith | |
| 6,730,225 B1 | 5/2004 | Duke et al. | |
| 2001/0047965 A1 | 12/2001 | Ghalib | |
| 2002/0008064 A1 | 1/2002 | Hamamoto et al. | |

OTHER PUBLICATIONS

Hawley's Condensed Chemical Dictionary, 14th ed., pub. John Wiley & Sons, Inc., 2002—heading is "cement, Portland.".*

Water Encyclopedia, ed. Jay Lehr et al., pub. John Wiley & Sons, Inc., vol. 1, pp. 192-196, Section 1.2.27 entitled "Disinfectants" by Raghuraman Venkatapathy et al., 2005. Water Encyclopedia, vol. 2, pp. 362-366, Section 2.5.87 entitled "Sorptive Filtration" by K.A. Matis and N.K. Lazarides, 2005.*

* cited by examiner

LIQUID FILTRATION SYSTEM

I. CROSS-REFERENCE TO RELATED APPLICATIONS

The present application is a Continuation-in-Part of U.S. patent application Ser. No. 11/043,379, filed on Jan. 26, 2005, titled Filter Element for Water Loaded with Solid Particles and Dissolved Toxic Substances and Purification System Equipped with Said Filter Element, listing Carsten Dierkes as inventor, herein incorporated by reference in its entirety.

II. FIELD OF THE INVENTION

Embodiments of the present invention generally relate to fluid filtration systems. Particularly, embodiments of the present invention relate to water filtration systems. More particularly, embodiments of the present invention relate to filtration systems for removing pollutants and other materials.

III. BACKGROUND

Surface runoff is a term used to describe the flow of water, from rain, snowmelt, or other sources, over the land surface, and is a major component of the water cycle. Runoff occurring on surfaces before reaching a channel is also called a nonpoint source. If a nonpoint source contains manmade contaminants, the runoff is called nonpoint source pollution. A land area which produces runoff draining to a common point is called a watershed. When runoff flows along the ground, it can pickup soil contaminants such as petroleum, pesticides (e.g., herbicides and insecticides), or fertilizers becoming discharge or nonpoint source pollution.

Urbanization increases surface runoff, by creating more impervious surfaces such as pavement and buildings, not allowing percolation of the water down through the soil to the aquifer. It is instead forced directly into streams or storm water runoff drains, where erosion and siltation can be major problems, even when flooding is not. Increased runoff reduces groundwater recharge, thus lowering the water table and making droughts worse, especially for farmers and others who depend on water wells.

When anthropogenic contaminants are dissolved or suspended in runoff, the human impact is expanded to create water pollution. This pollutant load can reach various receiving waters such as streams, rivers, lakes, estuaries and oceans with resultant water chemistry changes to these water systems and their related ecosystems. Further, there is considerable surface runoff in natural systems from animal wastes being entrained in runoff or from natural sediment loading in the absence of human alteration of the land. In underdeveloped countries the proportion of runoff attributable to natural factors has greater dominance, principally due to the lack of isolation of water supplies from potential runoff carrying animal waste.

Environmental issues associated with runoff include the impacts to surface water, groundwater, and soil through transport of water pollutants to these systems. Ultimately these consequences translate into human health risk, ecosystem disturbance, and aesthetic impact to water resources. Some of the contaminants creating the greatest impact to surface waters arising from runoff are petroleum substances, herbicides, and fertilizers. Quantitative uptake by surface runoff of pesticides and other contaminants has been studied since the 1960s, and early on contact of pesticides with water was known to enhance phytotoxicity, In the case of surface waters, the impacts translate to water pollution, since the streams and rivers have received runoff carrying various chemicals or sediments. When surface waters are used as potable water supplies, they can be compromised regarding health risks and drinking water aesthetics (e.g., odor, color, and turbidity effects). Contaminated surface waters risk altering the metabolic processes of the aquatic species they host; these alterations can lead to death, such as fish kills, or alter the balance of populations present. Other specific impacts are on animal mating, spawning, egg and larvae viability, juvenile survival, and plant productivity.

Storm water runoff from building roofs, parking lots, roadways, etc., picks up contaminants harmful to the environment if allowed to pass, untreated, into rivers, streams, aquifers and the like. The EPA has data suggesting polluted storm water runoff is a leading cause of impairment to the nearly 40% of surveyed U.S. water bodies which do not meet water quality standards. Over land or via storm sewer systems, polluted runoff is discharged, often untreated, directly into local water bodies. The pollutants may include solids including sand, gravel, grass, leaves, and the like. It is also known storm water runoff can pickup various nutrients, including phosphorous, potassium, and nitrates from lawn and agricultural fertilizers and heavy metals, including cadmium, zinc, copper, lead, nickel, chromium from metal building roofs, gutters, downspouts, and the like. Storm water runoff from roadways and parking lots include polycyclic, aromatic hydrocarbons from oils and motor fuels. Of course, significant concentrations of solids and dissolved pollutants should not be discharged to ground water or open watercourses. Also, the introduction of this water into the city sewer system is not desired, since a corresponding capacity must be reserved in this sewer treatment facility for this purpose.

In the case of groundwater, the main issue is contamination of drinking water, if the aquifer is abstracted for human use. Regarding soil contamination, runoff waters can have two important pathways of concern. Firstly, runoff water can extract soil contaminants and carry them in the form of water pollution to even more sensitive aquatic habitats. Secondly, runoff can deposit contaminants on relatively pristine soils, creating health or ecological consequences.

Mitigation of adverse impacts of runoff can take several forms: land use development controls aimed at minimizing impervious surfaces in urban areas; erosion controls for farms and construction sites; flood control programs; and chemical use and handling controls in agriculture, landscape maintenance, industrial use, etc.

Chemical use and handling has become a focal point mainly since passage of NEPA (National Environmental Policy Act) in the U.S. States and cities have become more vigilant in controlling the containment and storage of toxic chemicals, thus preventing releases and leakage. Methods commonly applied are: requirements for double containment of underground storage tanks; registration of hazardous materials usage; reduction in numbers of allowed pesticides; and more stringent regulation of fertilizers and herbicides in landscape maintenance. In many industrial cases, pretreatment of wastes is required to minimize escape of pollutants into sanitary or storm water sewers.

The U.S. Clean Water Act (CWA) requires local governments in urbanized areas (as defined by the Census Bureau) to obtain storm water discharge permits for their drainage systems. Essentially this means the locality must operate a storm water management program for all surface runoff entering the municipal separate storm sewer system. EPA and state regulations and related publications outline six basic components each local program must contain: public education (informing individuals, households, businesses about ways to avoid storm water pollution); public involvement (support public participation in implementation of local programs); illicit discharge detection and elimination (removing sanitary sewer or other non-storm water connections); construction site runoff controls (e.g., erosion and sediment controls); post-construction (i.e., permanent storm water management controls; and pollution prevention and "good housekeeping" measures (e.g., system maintenance). Other property owners which operate storm drain systems similar to municipalities, such as state highway systems, universities, military bases and prisons, are also subject to the permit requirements.

Surface runoff is not the only contaminate. Industrial process waters and contained water are polluted liquids providing potential hazards to the environment. Natural made contaminates, such as animal waste, also provide potential hazards to water supplies.

For liquids, such as water, loaded with solid particles and dissolved toxic substances, it is desirable to have a structurally simple filter element, performing as a purification system, which effectively removes the solid particles and particulate toxic substances from the liquid without great expense.

IV. SUMMARY OF THE INVENTION

In some embodiments, a filtration system may include one or more of the following features: (a) a housing having a bottom portion, a middle portion coupled to the bottom portion and an upper portion, and a cap coupled to the upper portion, (b) a sediment storage area within the bottom portion, (c) a separator area within the middle portion, (d) a porous filter within the upper portion, (e) an access hatch within the cap, (f) an inlet pipe for allowing storm water within a middle chamber, (g) an outlet pipe for allowing filtered water to be discharged from the filtration system, and (h) a central pipe being a passageway through the porous filter.

In some embodiments, a filtration system may include one or more of the following features: (a) a housing having a bottom portion, a middle portion coupled to the bottom portion and an upper portion, and a cap coupled to the upper portion, (b) a sediment storage area within the bottom portion, (c) a separator area within the middle portion, (d) a filter within the upper portion, the filter being a molded body of porous concrete, (e) an access hatch within the cap, (f) a water inlet opening into the upper portion and a water outlet opening from the upper portion, and (g) a pre-filter leading to the water inlet for leaves and refuse.

In some embodiments, a storm water treatment apparatus may include one or more of the following features: (a) a shaft having a bottom, at least one sidewall and a top spaced from the bottom by the at least one sidewall, and a storm water inlet port formed through the at least one sidewall at a predetermined distance above the bottom, (b) an inlet pipe disposed in the inlet port and oriented to produce a circulatory flow of storm water within a portion of the shaft located below the inlet port for facilitating sedimentation of solid contaminants present in the storm water, (c) a pervious concrete filter member dimensioned to abut the at least one sidewall and is horizontally disposed within the shaft at a location above the storm water inlet port, (d) an outlet in the at least one sidewall located above the level of the pervious concrete tilter member whereby storm water exiting the shaft must first pass through the filter member, (e) an annular baffle overlaying the frusto-conically shaped recess in the bottom of the shaft, and (f) a clean-out passage extending from a location proximate the top to the frusto-conical shaped recess.

In some embodiments, a method of constructing a filtration system may include one or more of the following steps: (a) forming a housing hating a bottom portion, a middle portion, an upper portion, and a cap, (b) coupling the bottom portion having a sediment storage area within the bottom portion to the middle portion having a separator area within the middle portion, (c) coupling the middle portion to the upper portion having a porous filter within the upper portion, (d) coupling the upper portion to the cap having an access hatch within the cap, and (e) forming an inlet pipe for allowing storm water within a middle chamber.

In some embodiments, a method of constructing a filtration system may include one or more of the following steps: (a) forming a sediment storage area adjacent a bottom of a housing, (b) locating a separator area above the sediment storage area and below a porous filter, (c) coupling a cap having an access hatch above the porous filter, (d) forming an outlet pipe for allowing filtered water to be discharged from the filtration system, (e) traversing a central pipe through the porous filter, and (f) inserting an inlet pipe into the housing at an angle above the separator.

VI. DESCRIPTION OF THE EMBODIMENTS

The following discussion is presented to enable a person skilled in the art to make and use the present teachings. Various modifications to the illustrated embodiments will be readily apparent to those skilled in the art, and the generic principles herein may be applied to other embodiments and applications without departing from the present teachings. Thus, the present teachings are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of the present teachings. Skilled artisans will recognize the examples provided herein have many useful alternatives and fall within the scope of the present teachings. While embodiments of the present invention are discussed in terms of a water runoff filtration system, it is fully contemplated embodiments of the present invention could be used in most any liquid filtration system without departing from the spirit of the invention.

Embodiments of the present invention can have a cylindrical housing built in modular sections, beginning with a lower portion consisting of a "sump" section and a cyclonic separator section stacked on top of the sump section. A upper portion of the cylindrical housing carries a filter and other components as described below. The upper portion can be stacked directly on top of the separator section. It is closed at the top by a "cap" section. These modular sections can be made of pre-cast concrete and collectively create a single cylindrical unit.

The upper portion can include an inlet pipe, a filter section, an outlet pipe, and a cleanout pipe extending into an opening through the filter section. The top or "cap" section can include an access hatch.

When the upper portion is mounted on top of the separator section, the inlet can be positioned so it will deliver contaminated water into a region between the cyclonic separator and the filter or, in other words, above the separator but below the filter. The contaminated water swirls around above the separator, allowing heavier sediments to precipitate and drop down into the sump section. The water pressure which drives the incoming flow then forces the contaminated water to flow up (or "up-flow") through the filter, thus further removing contaminants. After passing up through the filter into a chamber above the filter, the filtered water is discharged via the outlet pipe.

This system has several advantages over previous designs from the standpoint of cost of installation and maintenance. Previous systems have been expensive to build and maintain. The modular system described above is easy to install. The cleanout pipe permits easy and direct access to accumulated sediment or sludge in the sump section by a maintenance person. It is located so the maintenance person can open the access hatch and have direct, line of sight access to the sump section for easily pumping it clean via conventional mechanical suction devices.

The system disclosed here is designed so the filter may be periodically cleaned by reverse flushing the filter with water, thus driving accumulated contaminates backward from the filter. During maintenance and cleanout, the maintenance person will typically pump out the sump section, reverse flush the filter, and then pump the sump section clean a second time.

The filter can be, made of porous concrete. Occasionally, the filter itself will become fouled to the point where it can no longer be adequately cleaned by reverse flushing. Alternatively, there may be a need to change to a different type or porosity of concrete filter designed to remove a different set of contaminants or to operate at a different flow rate. To accommodate easy filter replacement, the filter can be installed in fitted sections horizontally across the upper portion of the housing. This makes it easy to install and remove an otherwise heavy and bulky concrete filter. The sections are sealed together by conventional insulating foam or the like. The cap section of the cylindrical housing may be lifted entirely from the filter structure in order to provide access to the filter for a replacement operation. The modular filter is also designed to be installed or replaced through the access opening in the center of the cap section. This can enhance the long term maintainability (see FIG. 5).

While removal efficiencies will vary depending on the makeup of the concrete filter, the filtration system described here is capable of exceeding both North American and European pollutant removal standards.

Figure 1:
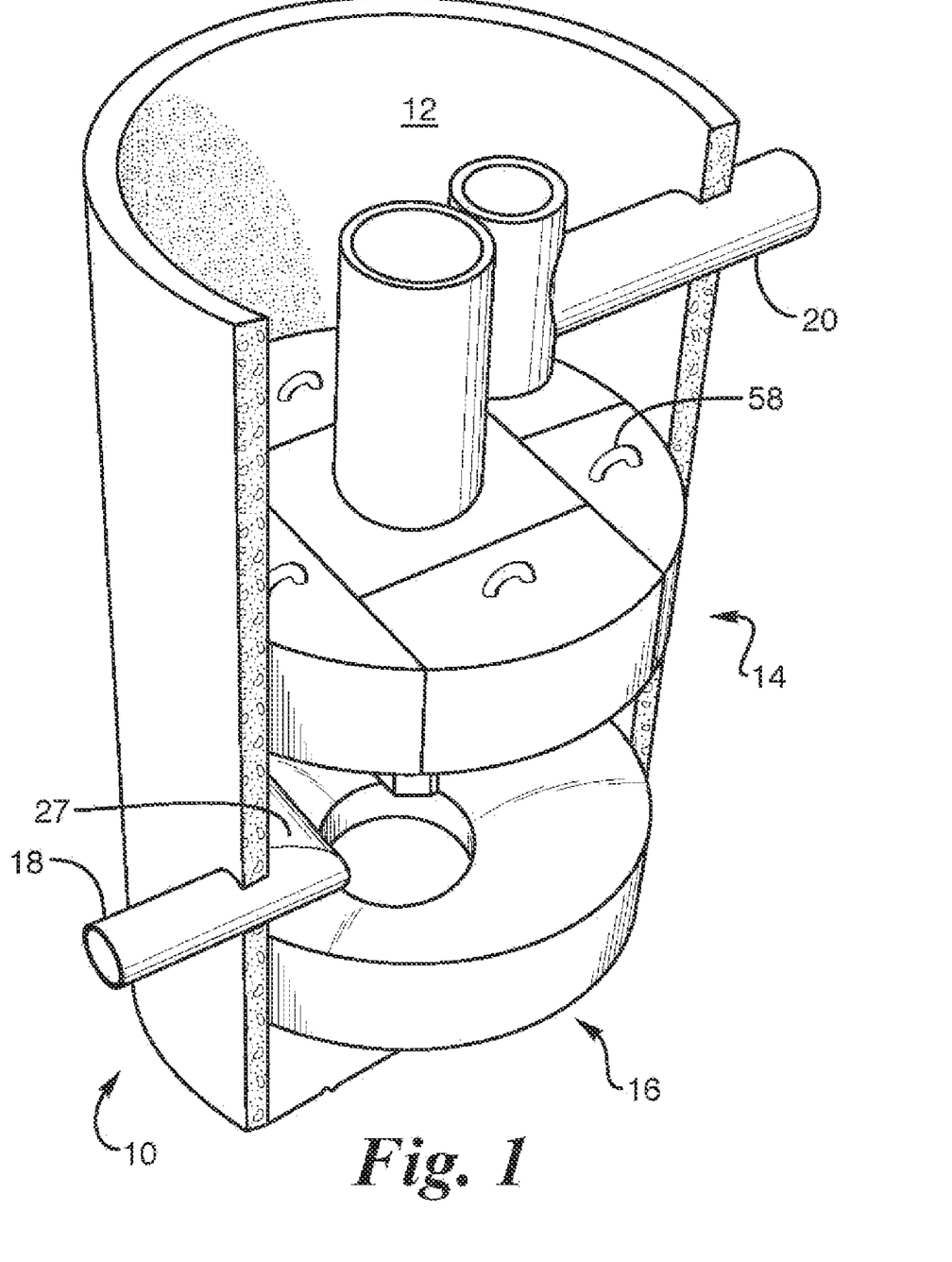
FIG. 1 is a sectioned, pictorial view of a storm water filtration system constructed in accordance with an embodiment of the invention.

Referring now to the drawings, and first to FIG. 1, shown generally at 10 is a storm water filtration system constructed in accordance with an embodiment of the invention. The filtration system 10 is primarily composed of a cylindrical housing 12, a porous concrete filter 14 (further described later), a hydrocyclonic or "cyclonic" separator 16, an inlet pipe 18 and an outlet pipe 20. All pipes used in this system are conventional. The cylindrical housing 12 and cyclonic separator 16 can be made from pre-cast concrete sections, or the like, as will be further described below. However, cyclonic separator 16 can be made of other materials including, but not limited to, fiberglass, polymers, or aggregate without departing from the spirit of the invention.

Figure 3:
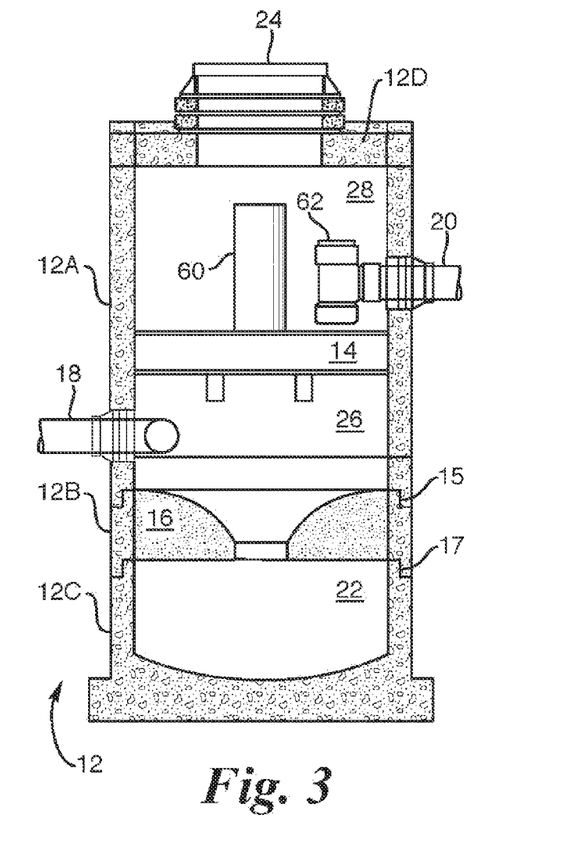
FIG. 3 is side cutaway profile view of a filtration system in an embodiment of the present invention.
Figure 4:
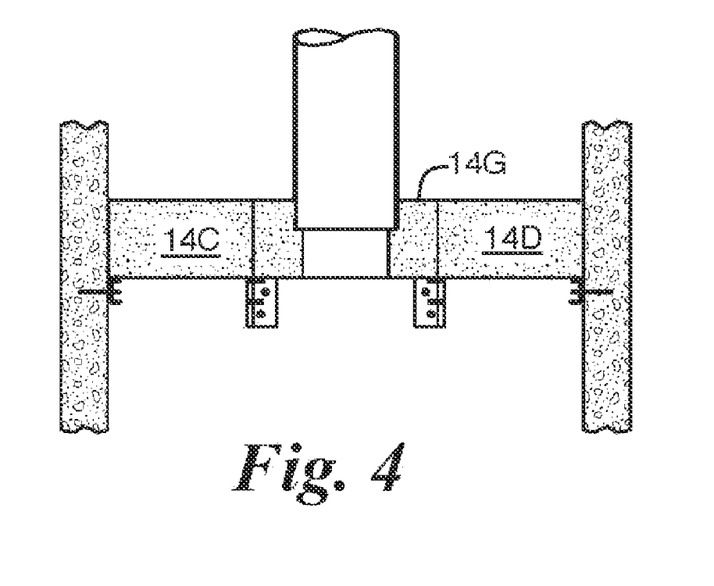
FIG. 4 is a side view of a porous concrete filter and overflow pipe which makes up internal components of a filtration system in an embodiment of the present invention.

As best shown in FIG. 3, the cylindrical housing 12 is made up of one or more different modular sections 12A, 12B, 12C, 12D vertically stacked one on top of the other. While FIG. 3 shows cylindrical housing 12 made up of four modular sections, it is fully contemplated cylindrical housing 12 could be made up of most any number of modular sections without departing from the spirit of the invention. Section 12A makes up the top, or upper, portion of the cylindrical housing 12; section 12B is the middle; section 12C is the bottom; and section 12D is a cap resting on section 12A and closing the top of cylindrical housing 12.

Each of the three stacked sections 12A, 12B, and 12C may vary in size. By way of example, for a system designed for use in flow applications where treatment flow is, but not limited to, less than 0.8 cubic feet per second, and peak flow is, but not limited to, 2.0 cubic feet per second or less, the approximate dimensions would be as follows: (1) the internal diameter of the cylindrical housing can be 60.0 inches; (2) section 12C functions as a sediment basin or sump and can have sufficient vertical height to create 24 inches of sump space below section 12B; (3) section 12B is the cyclonic separator section and can have a vertical height of about 12 inches; and (4) section 12A can have a height of about 72 inches. The overall height of system 10 is approximately 10 feet. While specific dimensions have been given above, it is fully contemplated most any of these dimensions could be altered without departing from the spirit of the invention. These dimensions could change depending on the filtration specifications needed or as stated above the treatment flow necessary for filtration system 10.

As indicated above, section 12C provides a sediment storage area 22 and makes up the bottom portion of filtration system 10. It can be sloped toward center-bottom to allow sediment to settle in the center of the cylindrical housing 12 for cleanout purposes. Section 12B rests directly above and on section 12C. It carries the cyclonic separator 16. Likewise, section 12A rests on top of section 12B. For systems designed out of concrete, all of these sections 12A, 12B, and 12C have annular shoulders on their tops and bottoms (e.g., numerals 15, 17 in FIG. 3) so one can be stacked on top of another at the installation site. Annular shoulders 15 and 17 can also have rubber gaskets to provide water tight sealing. This configuration allows system 10 to be pre-cast in sections elsewhere and then transported to a worksite for assembly and installation. For systems where filtration system 10 is designed out of other materials such as fiberglass, stainless steel, or other polymers, sections 12A, 12B, and 12C may be made of one section and may not require the use of annular shoulders or gaskets.

The cap 12D, which rests directly on top of section 12A, has an access hatch 24. The access hatch 24 normally remains closed until a maintenance person needs to access the interior of the system 10 after assembly, typically to clean out the sediment storage area or slump 22. The seams where sections 12A, 12B, 12C fall below the invert of the outlet pipe 20 can also be sealed as needed for no leakage (e.g., with rubber gaskets 15, 17). Inlet pipe 18 and all piping network prior to the treatment unit below the invert elevation of the outlet pipe 20 will also be required to be watertight and leak free. This helps to maintain an internal water surface elevation not to extend below the invert of the outlet pipe 20, thus ensuring the constant submersion of the filter 14 at all times.

When system 10 is in use, untreated or unfiltered water enters the cylindrical housing 12 through inlet pipe 18. Inlet pipe 18 is located below porous concrete filter 14 and just above cyclonic separator 16 to deliver water directly into a middle chamber 26 above the separator 16.

Figures 7, 8:
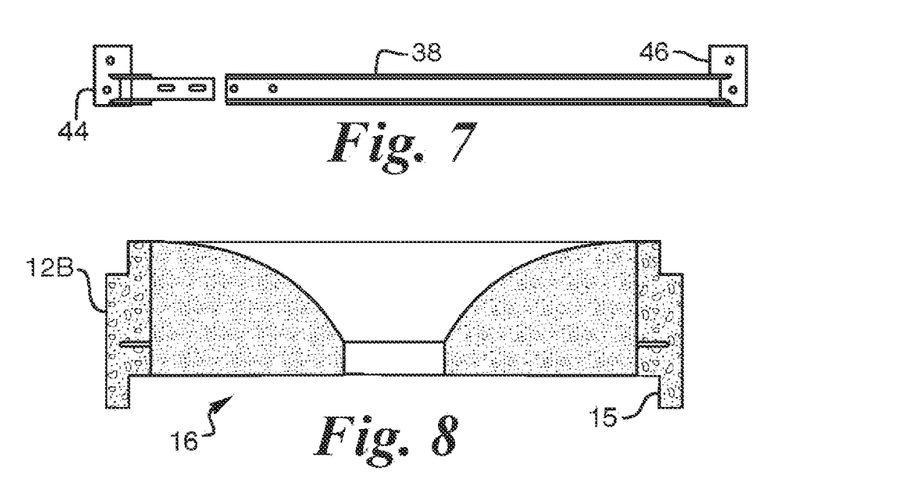
FIG. 7 is a side view of the filter support beam shown in FIG. 6.
FIG. 8 is a side sectional view of a cyclonic separator portion of a filtration system in an embodiment of the present invention.

After entering cylindrical housing 12, inlet pipe 18 turns at an angle of about 90 degrees (e.g., 27 in FIG. 1). This directs incoming water into a continually swirling action above cyclonic separator 16. The funnel-like shape of cyclonic separator 16, combined with the swirling movement of the water, promotes the separation of solid substances mixed in the incoming liquid. Separated solids then drop into sediment storage area or sump 22 where the water is calm and the solids are likely to never re-suspend until they are suctioned out through maintenance. FIG. 8 sets forth a more detailed illustration of cyclonic separator 16. As indicated above, separator 16 can be composed of concrete, fiberglass, stainless steel, or polymers and fashioned to have a shallow, funnel-like shape. Cyclonic separator 16 may be molded as part of the entire cylinder section 12B.

Unfiltered water can enter via inlet pipe 18 and eventually fill the space below filter 14. Water can then be forced upward and through filter 14 into an upper chamber 28. Concrete filter 14, which will be described in greater detail below, serves as both a physical and chemical filter removing contaminants from the water. When the water in chamber 28 reaches a sufficiently high level relative to outlet pipe 20, it is discharged from filter system 10.

As should be clear by now, system 10 cleans contaminated water in two stages. The first stage involves the separation of sediments by gravitation as water enters system 10 and swirls around above cyclonic separator 16. The second stage involves up-flow filtration through concrete filter 14.

Figure 9:
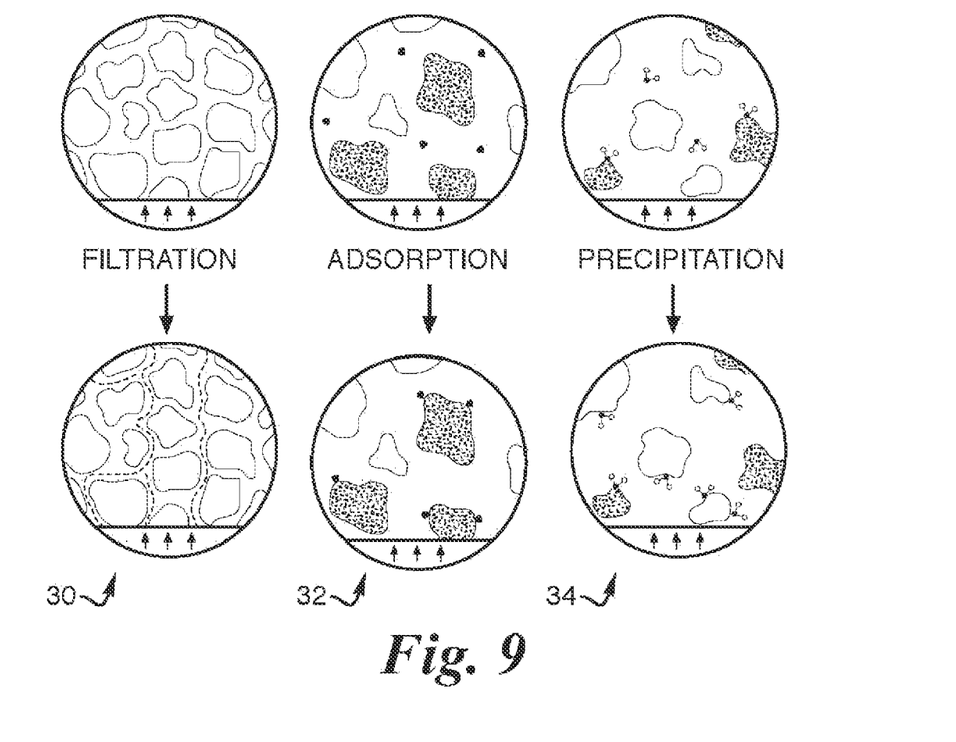
FIG. 9 is a schematic depiction of filtration, adsorption and precipitation processes within a filtration system's filter in an embodiment of the present invention.

FIG. 9 generally depicts how concrete filter 14 operates. Porous concrete filters can be designed to allow different flow rates through them. In this instance, porous filter 14 includes an iron compound causing filter 14 to act as both a physical and chemical filter.

The pores in the filter 14 partly serve to physically separate contaminants from the water, as indicated generally at 30 in FIG. 9. In addition, contaminants like hydrocarbons and dissolved heavy metals are adsorbed by the internal surfaces created by pores through filter 14. This is generally indicated at 32. In addition, the iron compound in filter 14 buffers and promotes chemical precipitation of some dissolved contaminants, as indicated at 34.

A uniqueness about the design described here is it has a physical design that is easy to assemble and maintain. Concrete filter 14 is also easy to replace which will eventually become necessary as the system 10 ages.

Figure 5:
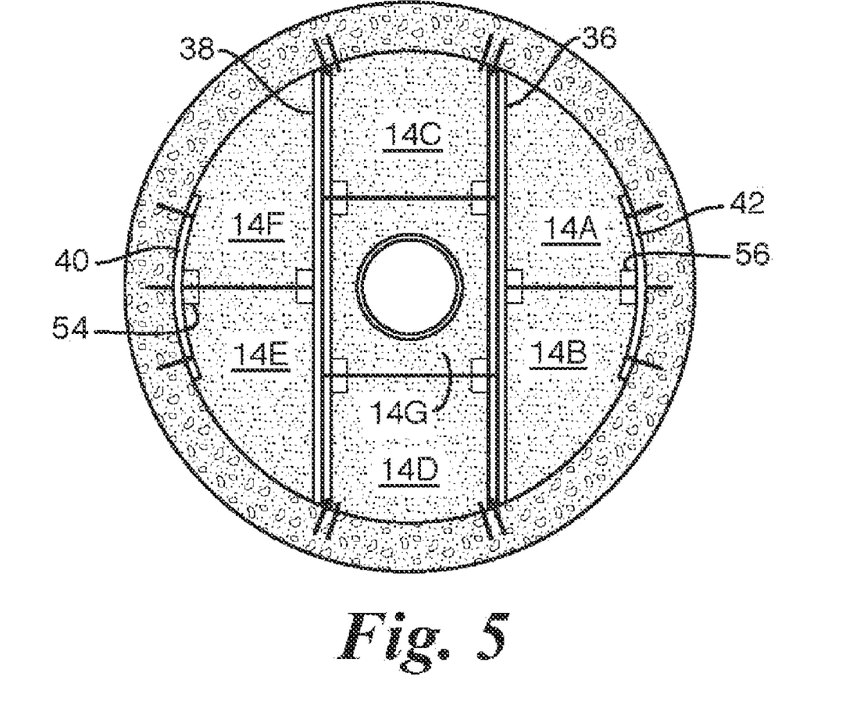
FIG. 5 is a top view of FIG. 4.
Figure 6:
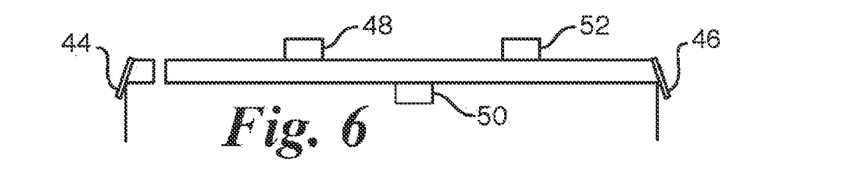
FIG. 6 is a view of a filter support beam in an embodiment of the present invention.

In this respect, FIG. 5 shows, physically, porous concrete filter 14 can be made up of several distinct filter pieces or sections, 14A-14G. These sections are supported inside section 12A by a framework of individual beam supports 36, 38 and channel side supports 40, 42. FIGS. 6 and 7 illustrate top and side views of the two beam supports 36, 38 extend across the inside of cylindrical section 12A. Each end 44, 46 of each beam support is anchored to the inside wall of section 12A. These supports 36, 38 have small rectangular supports 48, 50, 52 provide horizontal shoulders upon which filter sections 14A-14G rest. The two channel supports (one on each interior side of section 12A) have similar supports 54, 56; providing shoulders for filter sections 14A-14B and 14E-14F, respectively.

As illustrated in FIG. 1, each filter section 14A-14G has a handle 58 for installation and removal. During assembly of the various components of system 10, the framework described above is connected to the interior walls of section 12A and individual filter sections are installed on the framework. The filter sections are bonded together with a conventional sealing foam when installed, but may be easily broken or cut apart when and if it becomes necessary to remove them.

As illustrated in the various Figures, the system 10 includes a central pipe 60 creating a passageways through filter sections 14A-14G. The top of central pipe 60 is usually above the invert of the outlet pipe 20. As reflected in the drawings, outlet pipe 20 has an open "T" section 62 on the inside of cylindrical housing 12 allowing filtered water to pass out through outlet pipe 20.

During normal operation, as water "up-flows" through filter 14, into upper chamber 28 above filter 14, the water level will rise until the filtered water exits via outlet pipe 20. In extraordinary situations, such as extreme flooding, more contaminated water may enter the cylindrical housing 12 at a rate higher than the maximum flow rate filter 14 can handle. In such case, unfiltered water may eventually rise up and spill over the top of central pipe 60 until incoming flow levels are reduced.

Figure 2:
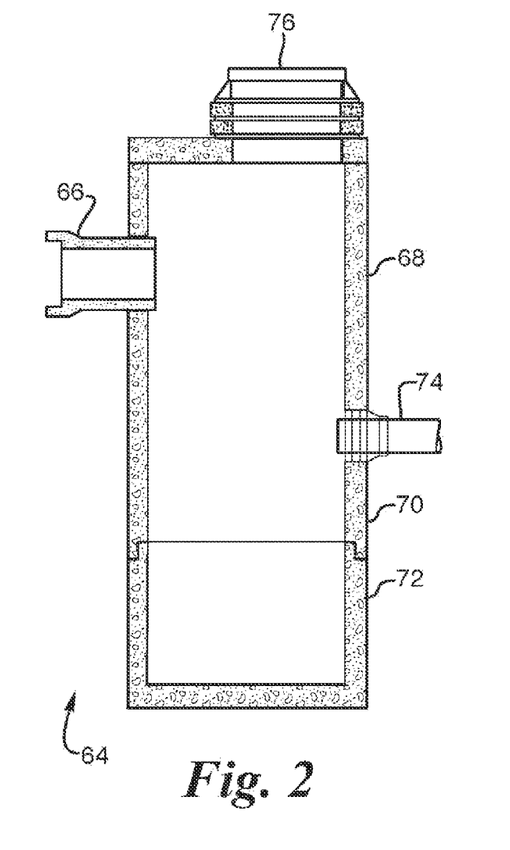
FIG. 2 is a side cross-sectional view of an upstream sump structure in an embodiment of the present invention.

FIG. 2 illustrates a separate, upstream sump structure, indicated generally at 64, for separating heavier sediments before contaminated water enters the cylindrical housing 12. The contaminated water enters inlet pipe 66 into a tank 68 formed in sections 70, 72, much like cylindrical housing 12. The outlet pipe 74 of the upstream sump stricture 64 is connected to the inlet pipe 18 of cylindrical housing 12. The sump structure 64 also has an access hatch 76 for clean-out purposes.

In another embodiment a filter element consists of a molded body of porous or pervious concrete and is a portion of a purification system as a body through which water flows. The molded body of concrete can have a pore ratio of 15% to 35% volume. The molded body can consist of a single grain-size concrete with a filter grain-size of 0.25 to 4.0 mm. The concrete can consist of natural or synthetic aggregates at 85% to 89% by volume and 11% to 15% by volume of binder. In one embodiment a blast furnace cement, for example CEM III/A according to DIN 1164-1 (Deutsches Institut für Normung), may be used. However, it is contemplated a suitable organic resin may be used as the binding agent. Suitable cements for embodiments of the present invention contain 35% to 64% by weight Portland cement clinker, 36% to 65% by weight granulated blast-furnace slag, as well as 0% to 5% by weight of conventional secondary components. To increase the adsorption action of the filter additives such as iron oxides and/or iron hydroxides ($Fe(OH)_2$) can be further added to the concrete, 1%-15% by weight, especially 3% to 7% by weight, relative to the binder content. Other suitable additives can be, in particular, Fe(III) oxides such as goethite, $Fe_2O_{3x}H_2O$ and/or hematite ($Fe_2O_3$). It is better for the adsorption characteristics for the concrete to contain up to approximately 10% by weight of aluminum oxides $Al_2O_3$ and/or layered silicates. At least one layer of porous concrete has a CaO content of 7% to 10% in the molded body to provide a sufficiently higher pH-value for the chemical precipitation of heavy metal ions.

According to an embodiment of the invention, the filter element is part of a purification system, in which the filter is arranged as a partition between a lower and an upper compartment of a treatment chamber, wherein a water feed opens into the lower compartment and a water outlet issues from the upper compartment.

The filter action of the filter element, according to the invention, is determined by the size and the design of the pores. The dissolved toxic substances are removed through adsorption, ion exchange, chemical precipitation, and/or chelation through a high CaO portion in the cement. To assist in adsorption, chemical precipitation, and chelation, the porous body has as large a surface as possible, relative to its volume. So the vast majority of particles are filtered out through the depth of the filter, the porous nature of the filter lends to maximizing the surface contact time of the pollutant to the filter. For example, the molded body could have an increasing fine porosity in the direction of flow. If the filter element has a modular design then individual filter parts can be replaced as needed. Solid particles are deposited on the filter element from below since the water to be purified in the purification system is forced to pass the filter element in the upward-flowing current. Thus, the filtered-out particles separate from the filter element and sink when the vertical current subsides. For this reason, the lower compartment can preferably be formed as a sedimentation space. In order to separate out the solid particles as effectively as possible, a hydro-cyclone baffle with sludge trap below it can be arranged in a sedimentation space. In order to activate the action of the hydro-cyclone, the water feed is made to flow into the lower compartment in a tangential manner.

The filter element made in accordance with embodiments of the invention and the purification system according to embodiments of the invention are suitable for removal of particulate and dissolved heavy metal ions such as Cu, Pb, Zn, Cd, and Ni from contaminated water, in particular rainwater flowing down from metal roofs and transport surfaces.

For the water outlet from the treatment chamber, there are different possibilities. Thus, the water outlet can be formed by porous parts of the chamber wall. Alternatively or additionally, it can be formed using a discharge pipe. In this case, the pipe is preferably, but not necessarily, designed as a seepage pipe and embedded in a water-permeable filter material. According to the predictable water accumulation, several such pipes can also be connected to the upper section of the treatment chamber in a parallel-facing or star-shaped arrangement. In this way, an infiltration trench system, known in the art, may be formed for the seepage of the filtered water.

The pipe, like the filter element, may consist of porous concrete. It then acts as a second filter stage, which in like manner as the first filter stage of the filter element, can filter out toxic substances not collected by the first stage.

Figure 10:
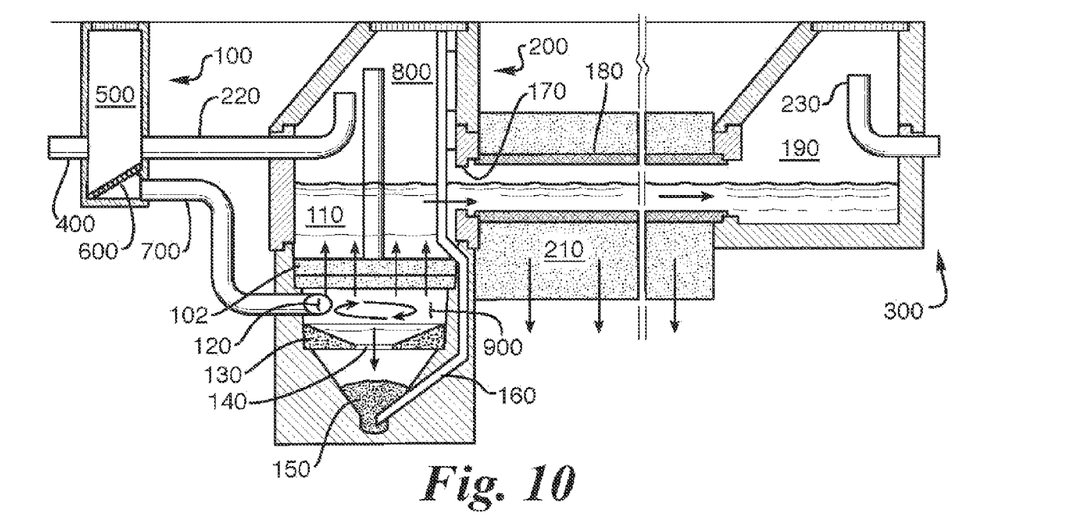
FIG. 10 shows a cross-sectional view of a purification system in embodiments of the present invention.

The purification system represented in FIG. 10 shows three generally vertical shafts arranged in the ground, which are connected to each other via pipes. A first shaft 100 may serve as the pre-filter. A second shaft 200 encloses the main elements of the purification system. A third shaft 300 serves as the control and rinsing shaft. The second shaft 200 may have a cylindrical tank adapted to be buried in the ground and is preferably formed from concrete, much like a manhole structure used in sewer systems. It is also contemplated shaft 200 may be fabricated from a suitable polymer, as discussed above. Shaft 200 includes a removable cover at the ground surface so the cover can be readily removed to provide access to the interior thereof for maintenance and repair purposes.

The water to be purified enters, via a pipe 400, a chamber 500 of shaft 100 and via a pipe 700, a lower compartment 900 of a treatment chamber 800 of shaft 200. Lower compartment 900 is separated from an upper compartment 110 of treatment chamber 800 by a filter element 102 having a modular design and arranged as a generally horizontal partition. A water inlet 120 of pipe 700 opens tangentially into lower compartment 900, so a swirling flow is generated. A 90 degree elbow attached to the end of pipe 700 may be used to promote a desired circular flow pattern. Arranged approximately at the center of lower compartment 900 can be a funnel-shaped element 130 with a central opening 140, which joins together with tangential inlet 120 forms a cyclone separator. The swirling flow provides a greater dwell time for non-floatable solids passing through sieve 600 to settle out. Via central opening 140, solid matter precipitating in lower compartment 900 call fall down into a sludge trap 150, from which it can be periodically suctioned by a maintenance worker via a disposal pipe 160. While disposal pipe 160 is shown as running along side filter element 102, it can also be designed to pass through filter element 102.

Figure 11:
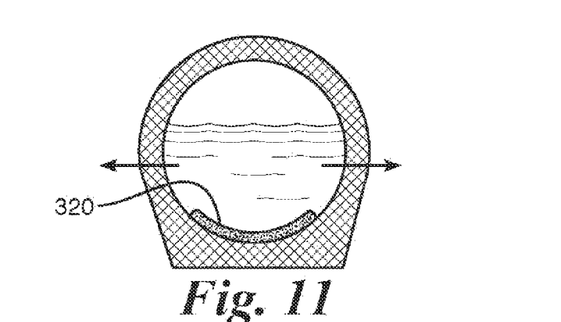
FIG. 11 shows a cross-sectional view of a seepage pipe of a purification system according to FIG. 10.

Filter element 102 can be constructed in a modular manner, perhaps similar to the discussion above, from one or more plates consisting of no-fine texture, porous concrete with a high portion of CaO component in the cement. The lower plates in a stack of such filter plates can have a more coarse porosity than the upper plates. Through this, the smaller solid particles of the water to be purified, which flows through filter element 102 in the up-flow process, are not already retained at the underside of filter element 102, but rather disperse in the deeper lying layers. The purified water reaches upper compartment 110 flowing off from there into a control and rinsing chamber 190 of control and rinsing shaft 300, via water outlet 170 and a pipe 180. Pipe 180 is designed as a seepage pipe and displays the cross section shown in FIG. 11. Like filter element 102, pipe 180 can consist of porous concrete, in particular with a pH-reactive floor of 320. Due to this floor of 320, the pH value of the water is increased to a value of 7 to 9. Pipe 180 of porous concrete is shown as being embedded in a so-called "infiltration trench", filling 210 consisting of a special filter material. This facilitates a large-surface distribution of the water to be drained away. It is to be understood several such pipes 180 can be connected to both the upper compartment 110 of shaft 200 and to the control and rinsing chamber 190. There local laws or regulations forbid the use of infiltration trenches, the filtered rainwater runoff can flow out from chamber 110, via non-porous pipe into a municipality's storm water server system.

In order to be able to receive an unexpectedly high volume and, if need be, to discharge it unpurified, an overflow pipe 220 is shown leading from pre-filter chamber 500 into upper compartment 110 of treatment chamber 800. In a corresponding manner, an overflow pipe 230 is connected to control and rinsing chamber 190, in order to allow water unable to seep to be discharged.

Alas FIG. 10 shows, the water outlet 170 is arranged so filter element 102 lies below the water line. Prevented through this is a drying out of filter element 102, and in particular, a caking in filter element 102 of solid particles such as clays, etc., which would negatively influence the effectiveness of filter element 102 and its service life and ability to be rinsed.

Water can also be introduced, via treatment chamber 800, in order to back-rinse filter element 102 from time to time. The particles loosened from filter element 102 then sink into sludge trap 150. In this way, material deposited in pipe 180 can also be rinsed into the control and rinsing shaft 190.

In accordance with embodiments of the present invention, filter element 102 can comprise a porous or permeable concrete material made from gravel or stone, cement (or any other bonding agent such as a synthetic resin), water, but little or no sand, and crushed quartz has been found to serve well as the aggregate. This mixture creates an open cell structure allowing storm water to filter through the porous concrete layers. Depending on the blend, stone size, head pressure and the thickness of the plates, the porous concrete filter element 102 can pass 15 to 25 gallons of water per minute through its open cells for each square foot of surface area also depending on the designed head pressure. It is fully contemplated the filter element 102 could pass any amount of water per minute based upon many factors such as the blend, stone size, thickness of the plates, head pressure, and concrete without departing from the spirit of the invention. As indicated, the pervious concrete may have a void structure of 20% to 25%, allowing water to readily pass through it at the rate indicated. The efficiency of removal of pollutants decreases with increasing pore size of the filter element 102 or increasing flow rate due to an increased head pressure. Where heavy metal concentrations in the storm water are low, a higher flow rate can be achieved using filter plates having a larger pore size. With larger pore sizes and medium-to-high metal concentrations in the storm water runoff, additives placed in the filter element 102 may be used to achieve sufficient cleaning capacity to meet applicable standards. The lime naturally occurring in cement renders the filter material alkaline and reacts with certain pollutants, such as phosphates, to precipitate and/or adsorb dissolved contaminants so they ultimately become entrapped in the filter element 102 or settle out into the sedimentation trap 150 at the base of shaft 200.

Hydrocarbons tend to become entrained in the pores of filter element 102. Chemical additives can be blended with the cement or resin used in forming the porous concrete to address selected target pollutants. For example, $Fe_2O_3$ in powder form having a particle size less than 1 micron may be added to cement prior to its being mixed with aggregate and water to form the porous concrete. The presence of the $Fe_2O_3$ has been found to enhance the ability of the filter plates to adsorb phosphorous.

Iron oxides and hydroxides promote the chemical precipitation of heavy metals as insoluble metal hydroxides and phosphates as iron-phosphates. Also, they enhance the ability of the filter 14 or filtration system 10 to adsorb pollutants. Other additives may include limestone expanded clay and recycled concrete.

Certain zeolites having an infinity to heavy metal ions can also be blended in with the crushed rock or stone and cement mixture so the zeolite can be embedded directly in the filter element 102. Alternatively, a layer of zeolite can be inserted in a space between adjacent plates of porous concrete filter element 102. Suitable zeolites may include clinoptilolite, phillipsite, or mordenite.

It is contemplated a slow release bactericidal agent can be added to the concrete blend or added as an intermediate layer between filter plates to kill various target bacteria, such as *E. Coli* resulting from fecal pollution.

In operation, storm water runoff from roads, parking lots, building roofs, etc., flows into shaft 100 where leaves, sticks, and other debris greater than the mesh size of sieve 600 are caught for subsequent removal. Storm water carrying particles of dirt and sand along with other dissolved pollutants flow through pipe 700 and through water inlet 120 into lower compartment 900 to create a circulating flow promoting the settling out of non-floatable debris into sump 150. As the storm water builds up in lower chamber 900, it ultimately permeates through the porous concrete filter element 102 to reach the level of outlet pipe 180. In passing through filter element 102, various pollutants are either trapped within the filter element 102 or are precipitated out therefrom to end up in the sump or sludge trap 150.

Be cause filter element 102 is constantly located under the static liquid level maintained in the vessel, it prevents drainage and resulting clogging of filter element 102 by fine sediments. Also, the circulatory flow of water beneath filter element 102 provides a scrubbing action tending to remove solid particles and oils from the undersurface of the filter element 102. The lifetime of the porous concrete filter material necessarily depends on the concentration of pollutants in the runoff water reaching shaft 200. On average, the filter element 102 need only be replaced about every two years. However, in many installations, much less frequent replacement is required.

Figure 12:
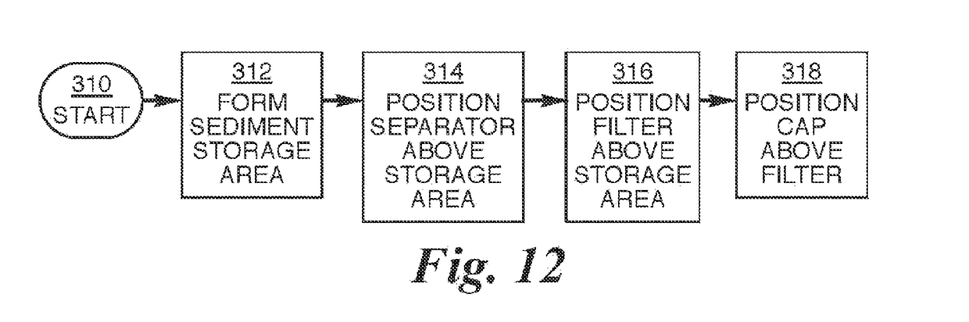
FIG. 12 shows a flow process diagram of a method of constructing a filtration system in an embodiment of the present invention.

With reference to FIG. 12, a flow process diagram of a method of constructing a filtration system 10 in an embodiment of the present invention is shown. In filtration system 10 construction process 310 sediment storage area 22 could be formed near the bottom of housing 12 at state 312. Separator 16 could then be positioned above sediment storage area 22 at state 314. Porous filter 14 can then be placed above separator 16 with inlet pipe 18 entering between filter 14 and separator 16 at state 316. Finally, cap 12D with access hatch 24 could be coupled above filter 14 having outlet 20 located inbetween at state 318.

Thus, embodiments of the LIQUID FILTRATION SYSTEM are disclosed. One skilled in the art will appreciate the present teachings can be practiced with embodiments other than those disclosed. The disclosed embodiments are presented for purposes of illustration and not limitation, and the present teachings are limited only by the claims follow.

What is claimed is:

1. A filtration system, comprising:
   a modular housing having a bottom portion, a middle portion coupled to the bottom portion and an upper portion, and a cap coupled to the upper portion;
   a sediment storage area within the bottom portion;
   a cyclonic separator area within the middle portion;
   a plurality of porous molded concrete filters within the upper portion; and
   an access hatch within the cap.

2. The filtration system of claim 1, further comprising an inlet pipe for allowing storm water within a middle chamber.

3. The filtration system of claim 2, wherein the middle chamber is located within the upper portion above the separator and below the porous filter.

4. The filtration system of claim 1, wherein the housing has a cylindrical shape.

5. The filtration system of claim 1, further comprising an outlet pipe for allowing filtered water to be discharged from the filtration system.

6. The filtration system of claim 1, further comprising a central pipe being a passageway through the porous filter.

7. The filtration system of claim 2, wherein the inlet pipe bends at an angle above the separator.

* * * * *